United States Patent
Hyde et al.

(10) Patent No.: US 9,087,282 B1
(45) Date of Patent: Jul. 21, 2015

(54) SELF-TUNING OF RFID TAGS USING NONUNIFORM IMPEDANCE STEPS

(71) Applicant: Impinj, Inc., Seattle, WA (US)

(72) Inventors: John Hyde, Corvallis, OR (US); Jay Kuhn, Seattle, WA (US); Theron Stanford, Seattle, WA (US); Harley Heinrich, Snohomish, WA (US); Christopher Diorio, Shoreline, WA (US); Ronald Oliver, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 14/213,453

(22) Filed: Mar. 14, 2014

Related U.S. Application Data

(60) Provisional application No. 61/783,746, filed on Mar. 14, 2013, provisional application No. 61/919,640, filed on Dec. 20, 2013.

(51) Int. Cl.
  *G06K 19/00* (2006.01)
  *G06K 19/07* (2006.01)
  *G06K 19/073* (2006.01)

(52) U.S. Cl.
  CPC .......... *G06K 19/0726* (2013.01); *G06K 19/073* (2013.01)

(58) Field of Classification Search
  CPC ................. G06K 19/07754; G06K 19/07756; G06K 19/0713; G06K 19/073; G06K 19/0726; G06K 19/07718; G06K 19/07796; G06K 7/10297; H03J 2200/00
  USPC .................. 235/492, 380, 451, 375; 340/10.1
  See application file for complete search history.

(56) References Cited

U.S. PATENT DOCUMENTS

| | | | |
|---|---|---|---|
| 2004/0217867 A1* | 11/2004 | Bridgelall et al. | 340/572.8 |
| 2012/0217311 A1* | 8/2012 | Rokhsaz et al. | 235/492 |
| 2013/0285763 A1* | 10/2013 | Granger-Jones et al. | 333/111 |
| 2014/0070010 A1* | 3/2014 | Diorio et al. | 235/492 |

* cited by examiner

*Primary Examiner* — Edwyn Labaze
(74) *Attorney, Agent, or Firm* — Turk IP Law, LLC

(57) ABSTRACT

An RFID tag tuning circuit may be capable of adjusting the impedance matching between an RFID integrated circuit (IC) and an antenna on an RFID tag to increase the amount of power that the IC can extract from an incident RF wave. The tuning circuit switches a variable impedance coupling the antenna and the IC between several different impedance settings, where each impedance setting differs from an adjacent impedance setting by a respective impedance step size and at least one impedance step size has a different value than another impedance step size. The tuning circuit may switch the variable impedance by incrementing through a counter, decrementing through the counter, or performing some search algorithm. The tuning circuit may also initialize the variable impedance based on a default impedance setting or a random impedance setting derived from a random counter.

20 Claims, 13 Drawing Sheets

SIGNAL PATH DURING R→T

SIGNAL PATH DURING T→R

| Tuning Control Interface Bit | 2 | 1 | 0 |
|---|---|---|---|
| Tuning Element Weight | $a$ | $a+b$ | $b$ |

| Tuning Circuit State | | | | Tuning Element Value | Tuning Element Delta |
|---|---|---|---|---|---|
| 0 (maps to 0) | 0 | 0 | 0 | 0 | |
| 1 (maps to 1) | 0 | 0 | 1 | $b$ | $b$ |
| 2 (maps to 2) | 0 | 1 | 0 | $a+b$ | $a$ |
| 3 (maps to 6) | 1 | 1 | 0 | $2a+b$ | $a$ |
| 4 (maps to 7) | 1 | 1 | 1 | $2a+2b$ | $b$ |

SELF-TUNING OF RFID TAGS USING NONUNIFORM IMPEDANCE STEPS

CROSS-REFERENCE TO RELATED APPLICATIONS

This application claims the benefit under 35 U.S.C §119 (e) of U.S. Provisional Patent Application Ser. No. 61/783,746 filed on Mar. 14, 2013, and U.S. Provisional Patent Application Ser. No. 61/919,640 filed on Dec. 20, 2013. The disclosures of the U.S. Provisional Patent Applications are hereby incorporated by reference in their entireties.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to an RFID tag tuning circuit capable of adjusting the impedance matching between an RFID integrated circuit (IC) and an antenna on an RFID tag to increase the amount of power that the IC can extract from an incident RF wave. The tuning circuit switches (i.e., adjusts, varies, or changes) a variable impedance coupling the antenna and the IC between several different impedance settings, where each impedance setting differs from an adjacent impedance setting by a respective impedance step size and at least one impedance step size has a different value than another impedance step size. The tuning circuit may switch the variable impedance by incrementing through a counter, decrementing through the counter, or performing some search algorithm. The tuning circuit may also initialize the variable impedance based on a default impedance setting or a random impedance setting derived from a random counter.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 15 is a table depicting tuning states for a 3-bit tuning control interface according to embodiments.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions. "Protocol" refers to an industry standard for communications between a reader and a tag (and vice versa), such as the Class-1 Generation-2 UHF RFID Protocol for Communications at 860 MHz-960 MHz by EPCglobal, Inc. ("Gen2 Specification"), versions 1.2.0 and 2.0.0 of which are hereby incorporated by reference.

Figure 1:
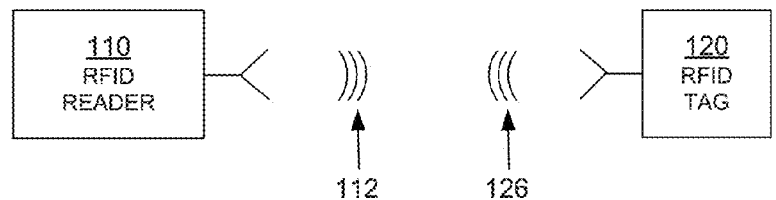
FIG. 1 is a block diagram of components of an RFID system.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals)

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
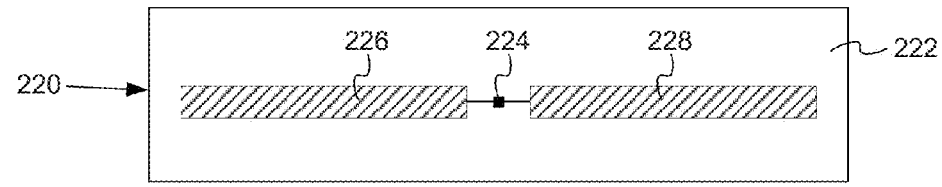
FIG. 2 is a diagram showing components of a passive RFID tag, such as a tag that can be used in the system of FIG. 1.
Figure 2:
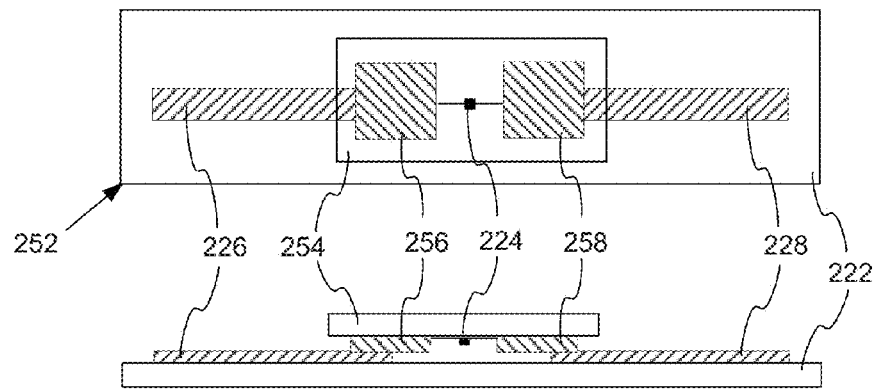
Figure 2:
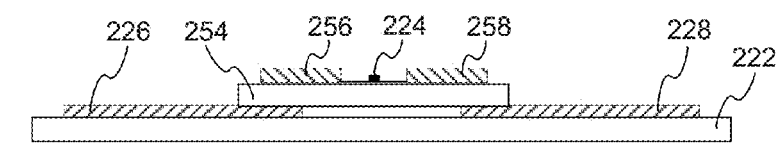

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath strap substrate 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

Figure 3:
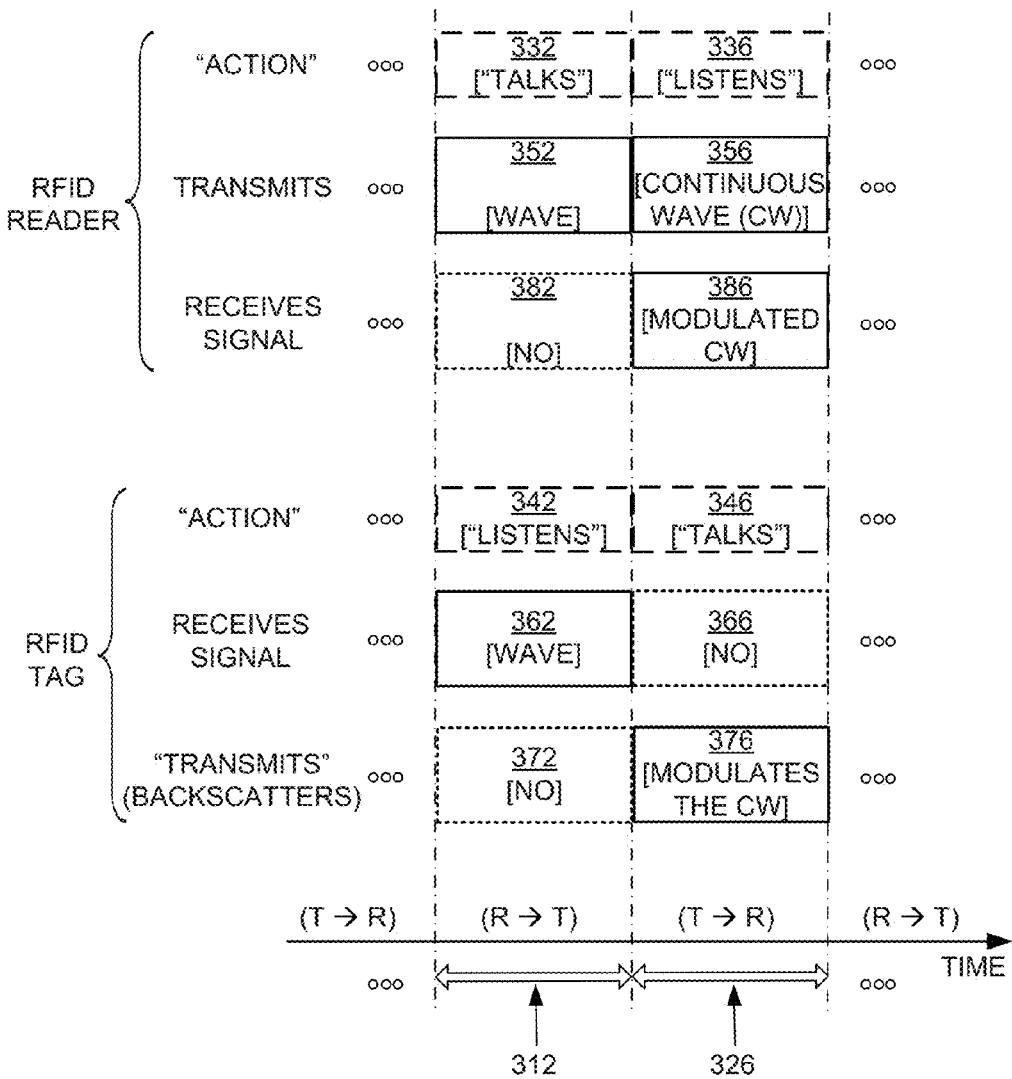
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326— here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

Figure 4:
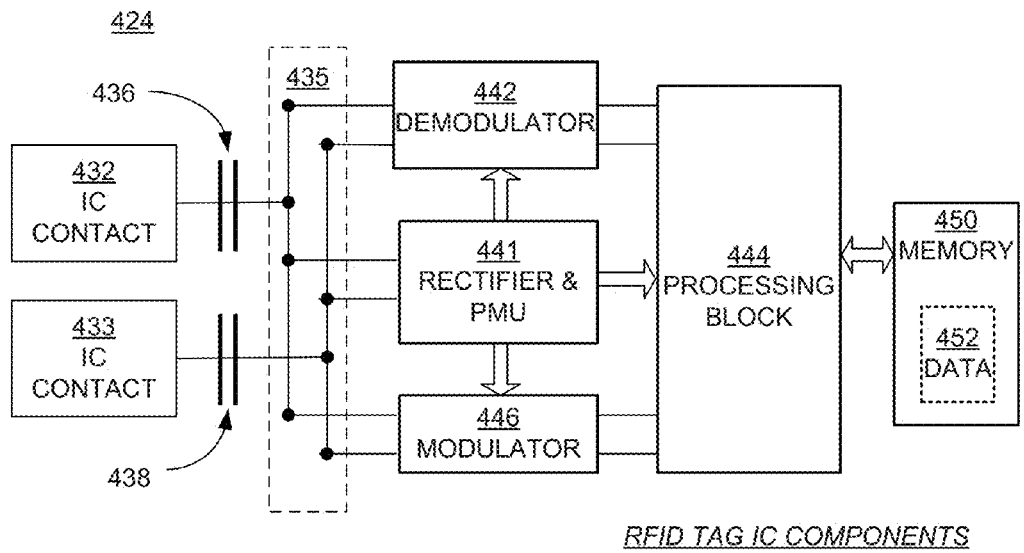
FIG. 4 is a block diagram showing a detail of an RFID tag, such as the one shown in FIG. 2.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/288 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches that can selectively route a signal, and so on. In some embodiments, circuit 424 includes optional capacitors 436 and/or 438. If present, capacitors 436/438 capacitively couple IC contacts 432/433 to signal-routing section 435, which in turn electrically couples to other components of circuit 424 described below. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or at least partly external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

Figure 5A:
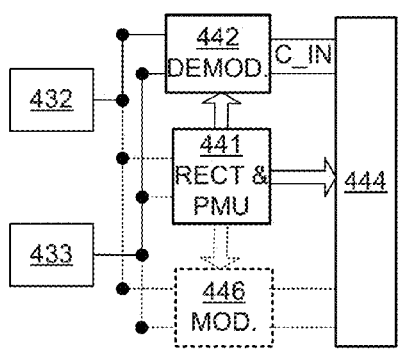
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

Figure 5B:
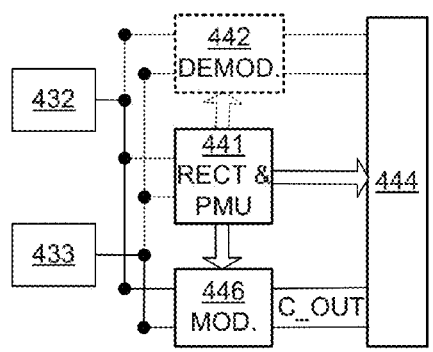

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Passive RFID tags rely on energy extracted from an RF wave to power the tag IC. In general, the efficiency of the RF power transfer from an RFID reader to a passive tag's IC directly affects the operational range of the RFID system. Accordingly, an RFID tag may include a matching network coupled between the IC and the antenna for matching the antenna impedance to the IC input impedance, thereby maximize power transfer to the IC. This matching network may employ discrete elements such as capacitors or inductors, or may be formed by the design of the antenna itself, and may be part of the antenna, part of the IC, part of both, or a standalone component. To ensure that as much of the RF power incident on the antenna is transferred to the IC, the source (antenna) impedance should be the complex conjugate of the load (IC) impedance. Unfortunately, antenna impedance may vary with environmental conditions such as humidity, substrate material, dielectric materials near the tag, etc. Similarly, IC impedance may vary with the processing of the IC itself. A matching network that matches antenna and IC impedances for one tag and one frequency under one condition may not match antenna and IC impedances for another IC at another frequency under a different condition. When the impedances vary the matching between the antenna and IC degrades, tag sensitivity degrades, and the operational range of the RFID system is reduced.

Figure 6:
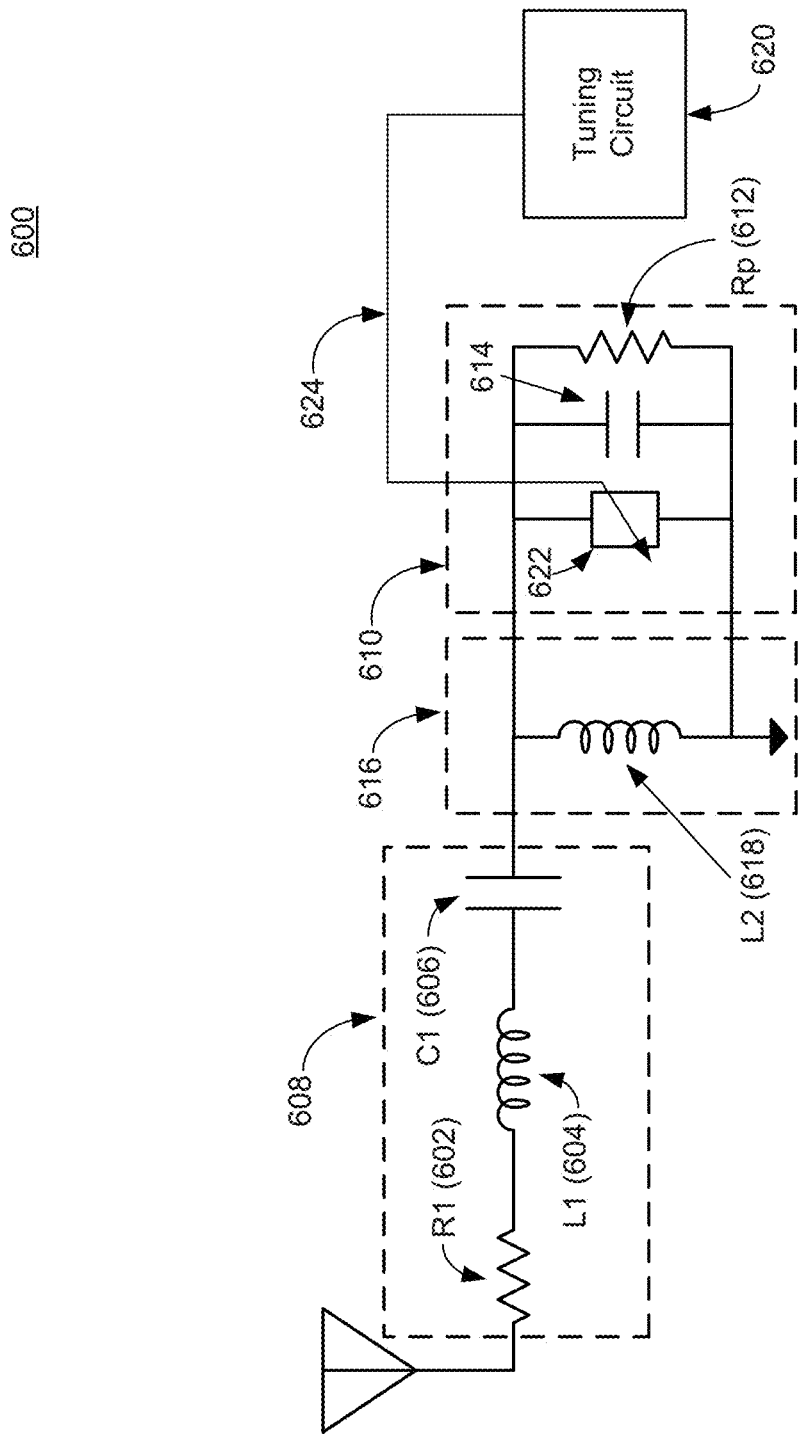
FIG. 6 depicts an RFID tag front-end equivalent circuit including a tuning circuit.

FIG. 6 is a diagram of an RFID tag front-end equivalent circuit 600 including a tuning circuit 620. RFID tag front-end equivalent 600 models the various impedances of an RFID tag and includes antenna section 608, IC input section 610, and matching network 616 that couples antenna section 608 to IC input section 610. Antenna section 608 includes inductor L1 604 and capacitor C1 606, which model the reactive portion of the antenna impedance, and resistor R1 602, which models the real portion of the antenna impedance. IC input section 610 includes a resistor Rp 612 that models the input resistance of the IC, a capacitor Cp 614 that models the input reactance of the IC, and a tuning element 622 coupled to tuning circuit 620 via tuning control interface 624. Matching network 616 includes inductor L2 618 that models the inductance of matching network 616.

To maximize power transfer between antenna and IC in equivalent circuit 600, the reactance of inductor L1 604 should be the complex conjugate of the reactance of capacitor C1 606, and the reactance of inductor L2 618 should be the complex conjugate of the reactance of IC input section 610. In this "matching" situation the equivalent circuit 600 reduces to the resistors R1 602 and Rp 612 in series.

Typical matching networks use components with static values, and therefore can only maximize power transfer and extraction for particular values of antenna and IC impedance. However, antenna and IC impedance values can vary greatly. For example, RFID tags often operate over a range of frequencies. Because antenna and IC impedances vary as a function of frequency, a matching network that is configured for maximum power transfer at one frequency may not maximize power transfer at a different frequency.

Other factors may also cause impedance variations and degrade power transfer. Statistical variations in component values during manufacturing may cause the actual antenna and IC impedances to differ from their designed values. Similarly, the environment in which the tag operates (e.g., operating medium such as air, water, etc., or environmental conditions such as temperature, humidity, time, pressure, etc.) or the dielectric properties of an item to which the tag is attached may alter the effective antenna impedance. Consequently, designing a matching network with static-valued components involves design compromises that typically provide good power-conversion efficiency in some circumstances but lower efficiency in other circumstances.

In contrast, the impedance of tuning element 622 in circuit 600 can be adjusted using tuning circuit 620 (via tuning control interface 624). If there is an impedance mismatch between antenna 608 and IC 610 then tuning circuit 620 can adjust tuning element 622 to compensate. Tuning circuit 620 in circuit 600 can be a standalone circuit or it can be integrated into an IC circuit block, such as one of the blocks in IC 424 of FIG. 4. Tuning element 622 may be implemented as a continuously variable element (e.g., a resistor, capacitor, or inductor) or as one or more switched capacitors. Of course, as will be apparent to one of ordinary skill in the art, tuning element 622 can include one or more variable capacitor(s), variable inductor(s), variable-length transmission line(s), variable resistors, etc. Any of these elements can be continuously variable or discretely variable (i.e. switched). For example, tuning element 622 may include one or more switched capacitors, switched inductors, switched transmission lines, and/or switched resistors. In some embodiments, tuning element 622 may only provide resistive components (i.e., no capacitors, inductors, or transmission lines). In one example embodiment tuning element 622 may be an array of switchable capacitors which is adjusted by tuning circuit 620.

In some embodiments, tuning circuit 620 is operable at an RF power level lower than that needed to operate the rest of the tag IC. For example, suppose that an RFID tag without tuning circuit 620 receives incident RF power sufficient to power the tag IC, but suffers from an impedance mismatch between the antenna and the IC such that the antenna does not transfer enough power to the IC to enable operation. In this case the incident RF field must be increased to enable to IC to operate. Now suppose that the tag is equipped with tuning element 622 and with tuning circuit 620. Further suppose that tuning circuit 620 is able to operate at an incident RF power level below the threshold for IC operation. In this case the tuning circuit can power-up and adjust tuning element 622 to reduce the impedance mismatch and improve power transfer between the antenna and the IC, thereby allowing the IC to extract enough power from the incident RF wave to operate.

Figure 7:
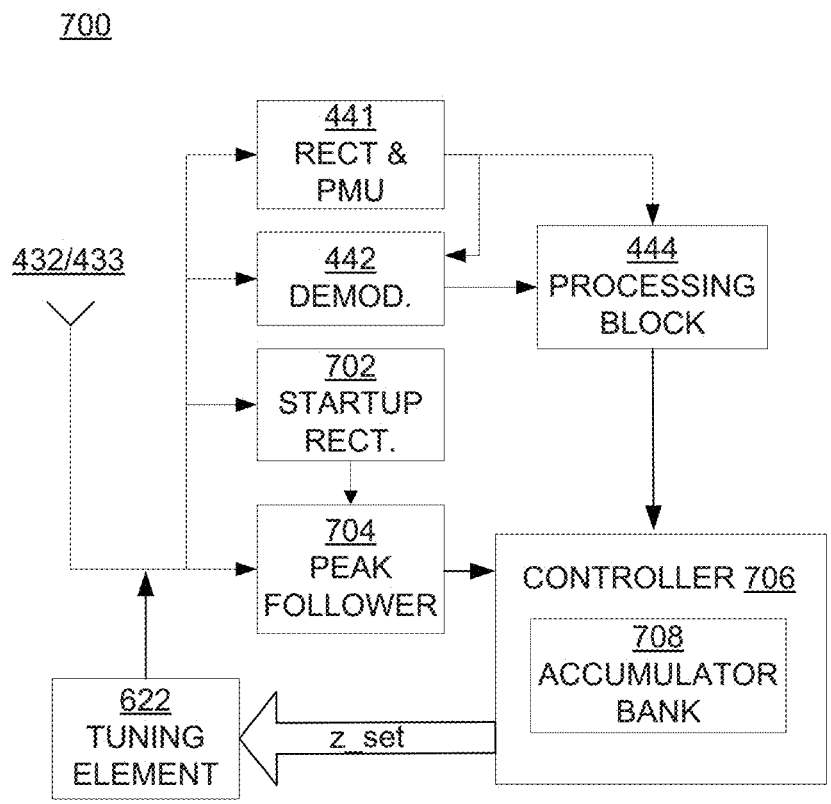
FIG. 7 is a block diagram showing how a tuning circuit may be implemented in an RFID tag.

In some embodiments, tuning circuit 620 may operate by varying the impedance value of tuning element 622, detecting the peak voltage at or power transferred to the IC at the different impedance values, and setting tuning element 622 at the impedance value that provides the highest peak voltage/power transferred. FIG. 7 is a block diagram showing how a tuning circuit such as tuning circuit 620 may be implemented in an RFID tag 700.

Portions of tag 700 are similar to circuit 424 in FIG. 4 and equivalent circuit 600 in FIG. 6, with similar components numbered similarly. Tag 700 implements a tuning circuit (similar to tuning circuit 620) that may include a startup rectifier 702, a peak follower 704, and a controller 706. Each of these components may be integrated into the tag IC, built on the tag 700, or be a standalone component attached to the tag 700. The startup rectifier 702 may be configured to provide power to the peak follower 704, controller 706, and/or tuning element 622. In some embodiments, components for matching tag IC/antenna impedance are configured to operate at a lower input power/voltage than components on the rest of the tag, so that tag impedance can be adjusted even if it is mismatched such that the received power is insufficient to operate other tag components.

The peak follower 704 is configured to identify the peak voltage for a given impedance value for tuning element 622. In some embodiments, the peak follower 704 includes a carrier peak detector (or "envelope detector") and/or an envelope peak detector (or "slicer peak detector"). Using the carrier peak detector ("envelope detector") as the peak follower 704 in some circumstances may be preferable due to higher bandwidth and better noise filtering/interference rejection. Also, the demodulator block 442 may itself include a carrier peak detector (used to recover the modulation envelope in normal tag operation), and this carrier peak detector can be used for impedance matching instead of the peak follower 704.

The controller 706, which may implement tuning circuit 620, is configured to receive detected peak voltage from the peak follower 704, store peak information in an accumulator bank 708, and provide an impedance control signal (e.g., via tuning control interface 624) to the tuning element 622. The impedance control signal may include a desired impedance for tuning element 622 or a setting for tuning element 622 corresponding to the desired impedance. Tuning element 622 in turn adjusts the network impedance matching between the tag antenna (connected to antenna contacts 422 and 423) and the rest of the tag based on the received impedance control signal.

In some embodiments, tag 700 implements an analog filter stage (not shown) including one or more capacitors or inductors. The analog filter stage may be placed before peak follower 704, and may be configured to reduce noise due to interference in a received signal, so that the peak follower 704 detects an actual peak voltage associated with the incoming signal rather than a spurious peak voltage associated with noise or interference in the incoming signal. In some embodiments, the analog filter stage is implemented using elements (e.g., capacitors or inductors) that may be reused after the tuning process. For example, the analog filter stage may include a capacitor that can then be reused for energy storage for other RFID IC operations.

Figure 8:
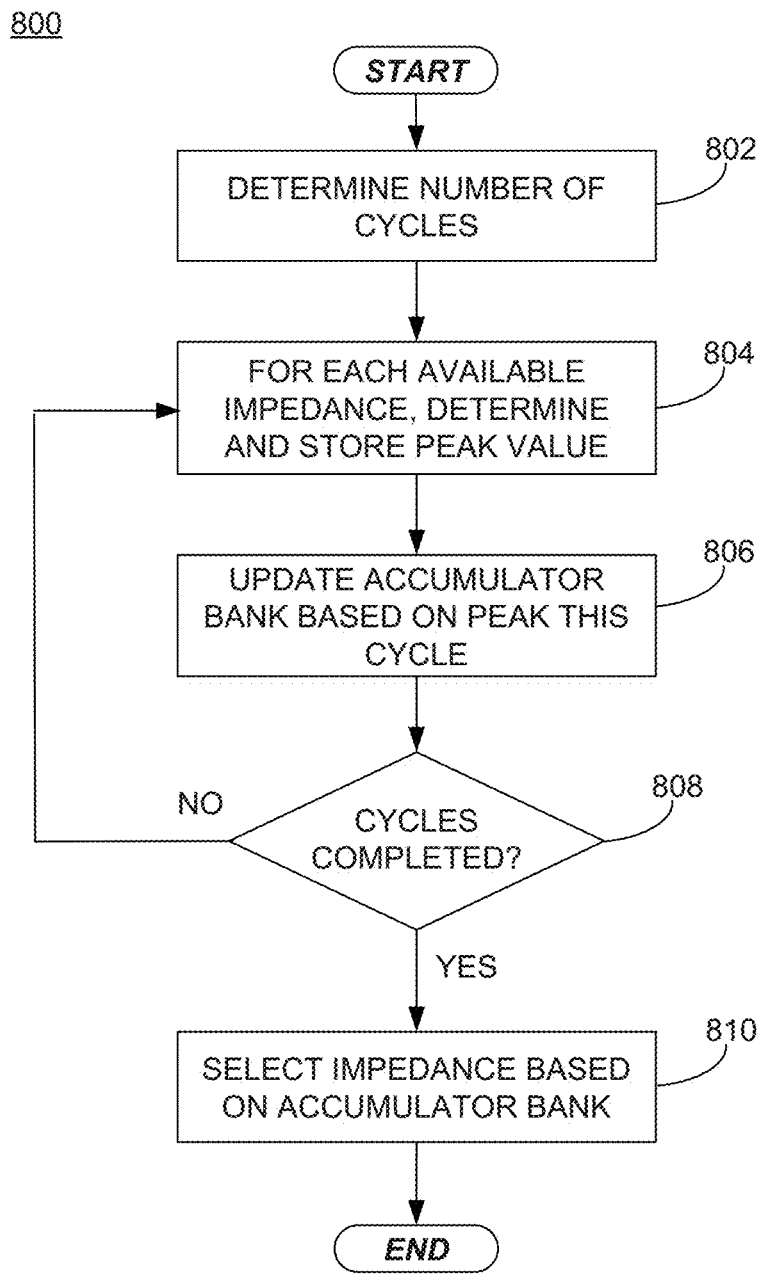
FIG. 8 is a flowchart depicting a process for tuning impedance matching between an RFID IC and a tag antenna.

FIG. 8 is a flowchart depicting a process 800 for tuning impedance matching between an RFID IC and a tag antenna. Process 800 may iterate repeatedly through available tuning element impedance values to determine the impedance value that provides the highest input peak voltage. In other embodiments, process 800 may also (or instead) determine the impedance value that provides the highest total input power.

In step 802, the number of impedance iteration cycles is determined. For example, the controller 706 or the IC may determine the number of cycles dynamically, or the number of cycles may be a predetermined value. In step 804, the controller 706 determines and store the peak input voltage value for each available tuning element impedance value. In some embodiments, the controller 706 may use filtering (e.g., averaging, integration, etc.) to reject noise and/or interference while determining the peak input voltage values. For example, the controller 706 may use n analog filter stage as described above. In some embodiments, the controller 706 may not treat a detected peak input voltage value as an actual peak unless the value exceeds some threshold determined based on potential noise or interference. Subsequently, in step 806, the controller 706 updates accumulator bank 708 based on the stored peak input voltage values determined in step 804. For example, the accumulator bank 806 may include a number of registers at least equal to the number of available tuning element impedance values or corresponding tuning element settings. The controller 706 may compare the stored voltage values determined in step 804 to determine the impedance value that provided the highest peak input voltage value. The controller 706 may then increment the value of the register in the accumulator bank 708 that corresponds to the determined impedance value. In some embodiments, instead of storing the actual voltage values, the controller 706 instead stores a rank for each available tuning element impedance value.

Subsequently, in step 808, the controller 706 determines if the number of times it has iterated through the available impedance values has reached the number of cycles determined in step 802. If not, the controller 706 returns to step 804. If so, in step 810 the controller 706 selects a desired impedance value based on the accumulator bank 708. For example, the value of an accumulator in the bank 708 may indicate the number of times its corresponding impedance value was determined to result in the highest peak voltage. Accordingly, the controller 706 may determine the accumulator with the largest value and select the impedance value corresponding to that accumulator.

Figure 9:
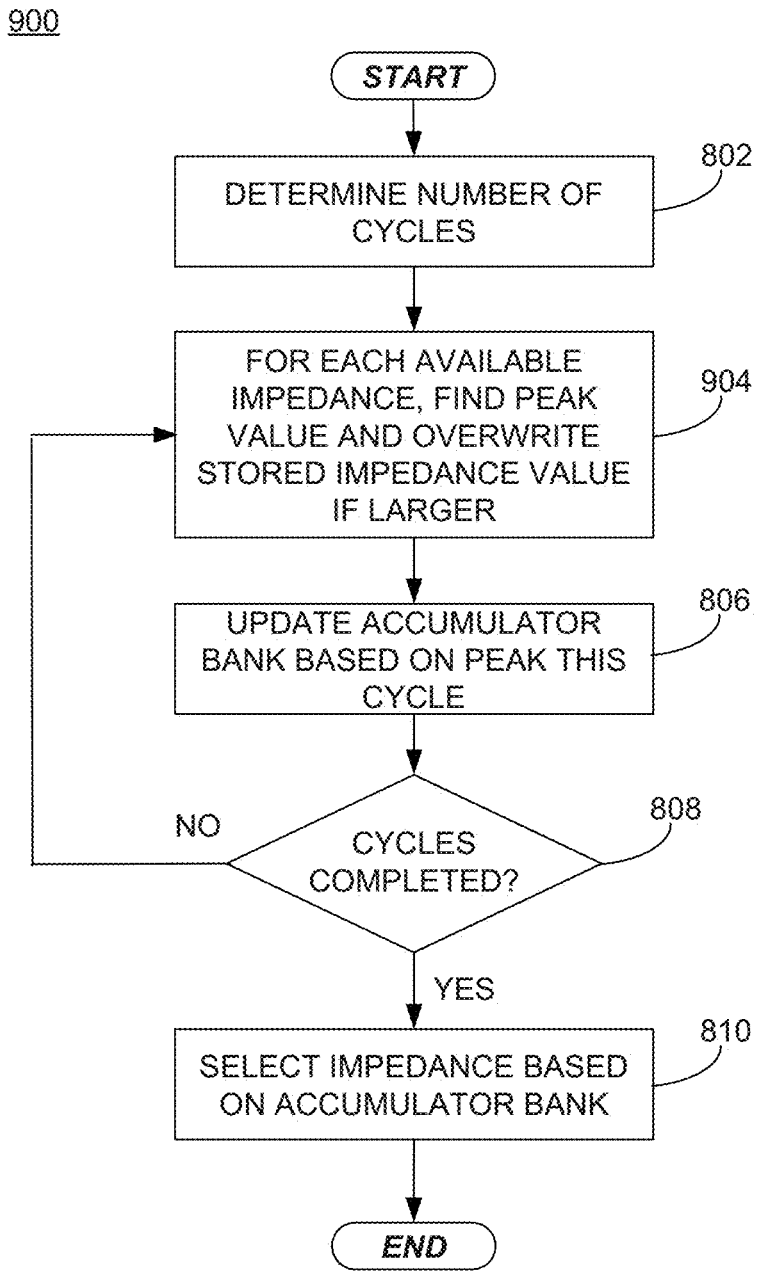
FIG. 9 is a flowchart depicting another process for tuning impedance matching between an RFID IC and a tag antenna.

FIG. 9 is a flowchart depicting another process 900 for tuning impedance matching between an RFID IC and a tag antenna. Process 900 is similar to process 800, with similarly-numbered steps behaving similarly. However, in step 904, instead of storing peak voltage values for every available impedance value, the controller 706 only stores the highest peak voltage value and the associated tuning element setting (which may also be referred to as the impedance setting) for the impedance value in that cycle. For example, when the controller 706 begins iterating through the available impedance values, it may store the first impedance setting and its associated peak voltage value (which is by default the highest in the current cycle). Subsequently, if another impedance value provides a higher peak voltage value, the controller 706 overwrites the stored data with the impedance setting corresponding to the new impedance value and its higher peak voltage. On the other hand, if another impedance value does not provide a higher peak voltage value than the impedance value corresponding to the stored impedance setting, the controller 706 will not overwrite the stored data. Thus, only one impedance setting and corresponding peak voltage value is stored, instead of all available impedance settings and their peak voltage values. In some embodiments, controller 706 moves to step 806 even if all available impedance values have not been iterated through. For example, if the stored data has not been overwritten for the last one, two, or more impedance values checked, the controller 706 may determine that the peak for this cycle has been found, and stop iterating through the rest of the available impedance values. In some embodiments, the controller 706 waits until the stored data has not been overwritten for the last two impedance values checked, to avoid distortion caused by noise/interference.

In processes 800 and 900, a controller or tuning circuit attempts to tune impedance matching by iterating through a number of different impedance settings. The impedance setting iteration process may be performed in several different ways. For example, each of the different impedance settings may correspond to a particular value of a counter. The sequence of counter values may directly correspond to the sequence of impedance settings, with lower counter values corresponding to lower impedance settings and vice-versa, or the counter values may relate to the impedance settings in some other way. In the former situation, the controller may be configured to iterate through the different impedance settings by starting at a particular default counter value (corresponding to a particular default impedance setting) and determining and/or storing the peak voltage value for the default counter value. The controller may then successively increment through counter values, determining and/or storing peak voltage values for each corresponding impedance setting. If the controller reaches a maximum counter value (corresponding to a maximum impedance setting), the controller may cause the counter to roll over to its minimum counter value (corresponding to a minimum impedance setting) and then continue to increment until the default counter value is reached. Of course, instead of incrementing the controller may successively decrement through counter values, and may cause the counter to roll over to its maximum counter value if a minimum counter value is reached and continue decrementing. In some embodiments, after causing the counter to roll over to its minimum or maximum value and continuing to increment or decrement, the controller may stop incrementing/decrementing the counter, thereby stopping the tuning process. The controller may stop the tuning process upon reaching the default impedance setting or reaching a stored impedance setting corresponding to the highest peak voltage value observed.

Figure 10:
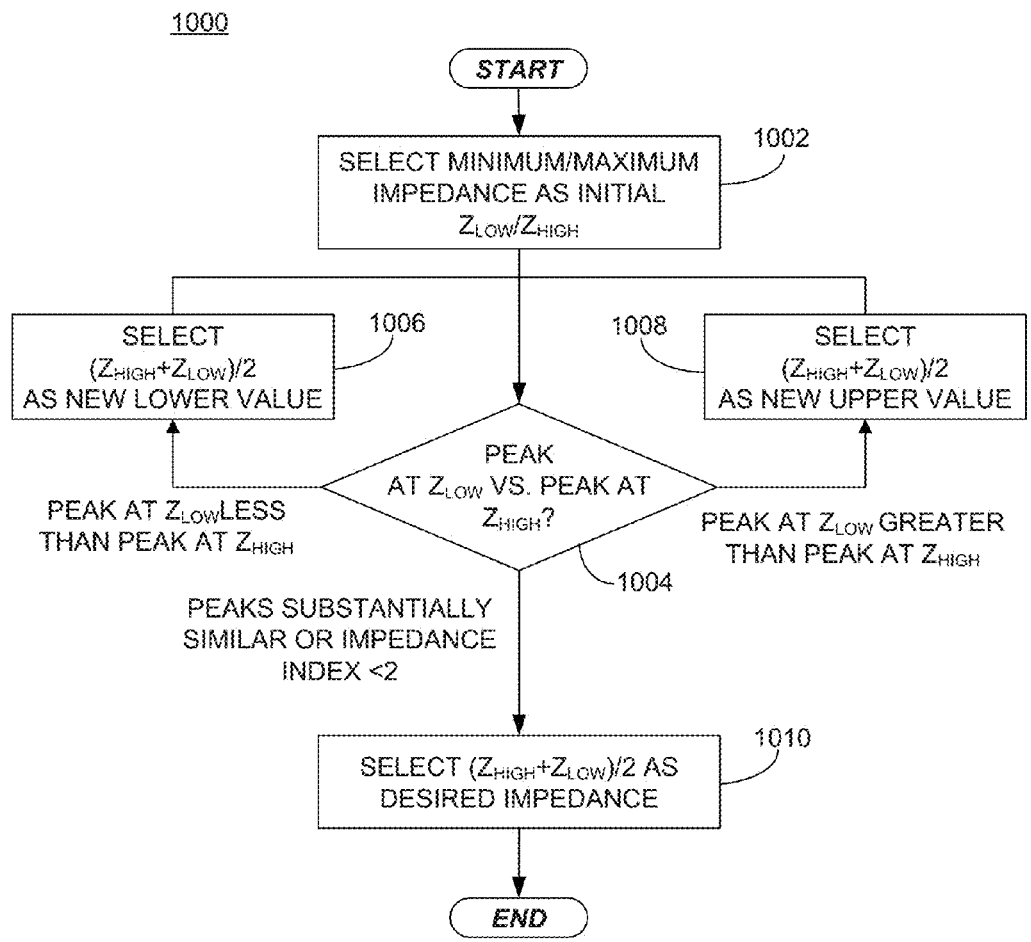
FIG. 10 is a flowchart depicting a binary search process for determining a desired impedance value between an RFID IC and a tag antenna.

In other embodiments, the controller may iterate through different impedance settings based on one or more search algorithms. For example, the controller may iterate through different impedance settings based on a binary search algorithm. FIG. 10 is a flowchart depicting a binary search process 1000 for determining a desired impedance value between an RFID IC and a tag antenna. In step 1002, a controller (e.g., controller 706) selects the minimum available impedance value as an initial lower impedance value, $Z_{LOW}$, and the maximum available impedance value as an initial upper impedance value, $Z_{HIGH}$. In step 1004, the controller determines the peak voltage (or power) value available at $Z_{LOW}$ and the peak voltage (or power) value available at $Z_{HIGH}$. The controller then compares the two peaks. If the peak at $Z_{LOW}$ is significantly less than the peak at $Z_{HIGH}$, then in step 1006 the controller updates $Z_{LOW}$ to the average of $Z_{HIGH}$ and the old $Z_{LOW}$. On the other hand, if the peak at $Z_{LOW}$ is significantly greater than the peak at $Z_{HIGH}$, then in step 1008 the controller updates $Z_{HIGH}$ to the average of the old $Z_{HIGH}$ and $Z_{LOW}$. Regardless of the impedance value that is updated, the controller returns to step 1004.

If the peaks at both $Z_{HIGH}$ and $Z_{LOW}$ do not differ significantly (e.g., the difference falls within a particular tolerance), or if the controller determines that the impedance index is less than 2 (i.e., there are less than two remaining available impedance values), in step 1010 the controller selects the average of the current $Z_{HIGH}$ and $Z_{LOW}$ as the desired impedance.

In some embodiments, instead of updating impedance values to the average of the previous impedance values (i.e., updated impedance=$(Z_{HIGH}-Z_{LOW})$*alpha, where alpha=0.5), the impedance updating process uses a different value for alpha. For example, the value of alpha may range between 0 and 1.

Figure 11:
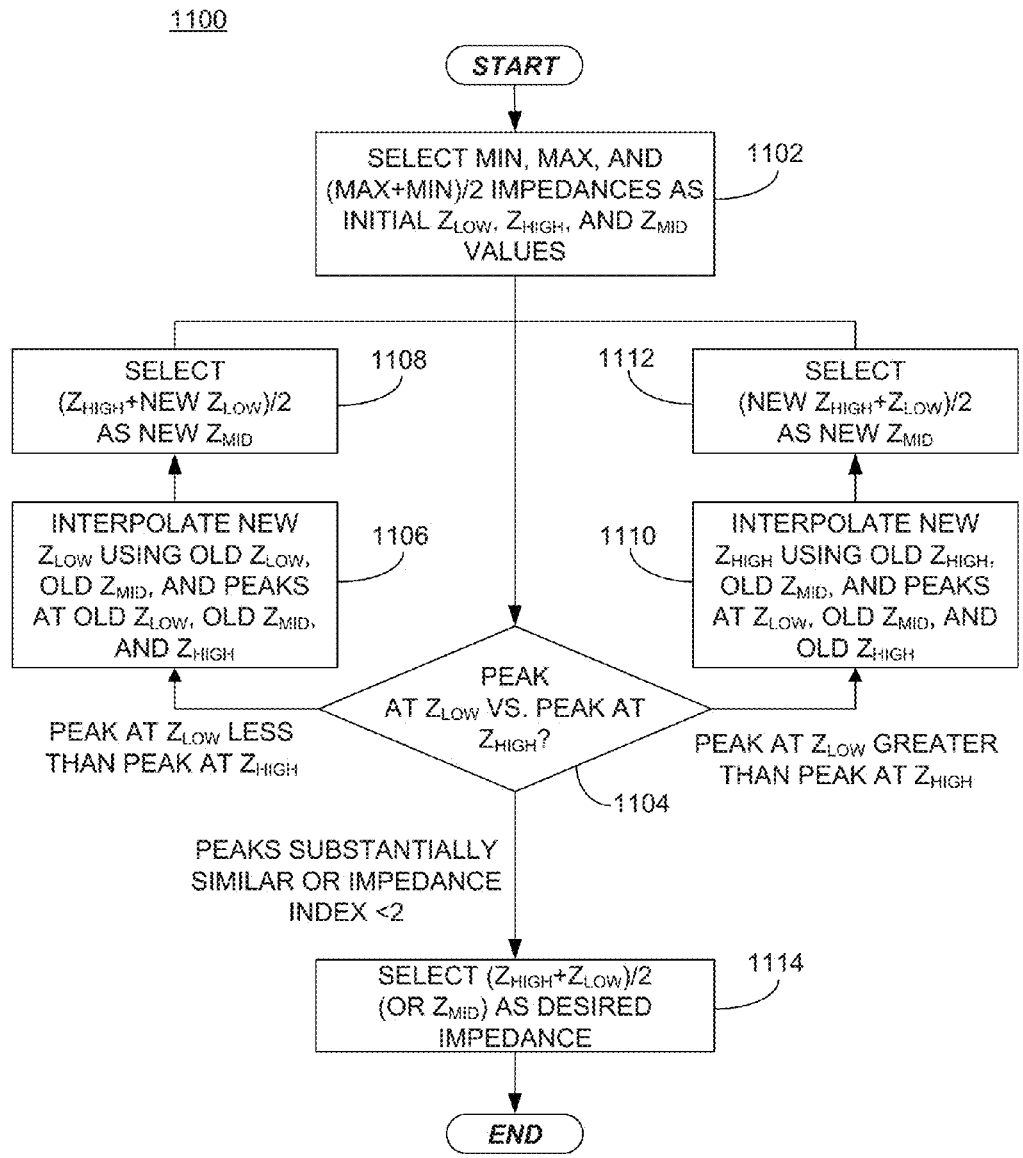
FIG. 11 is a flowchart depicting a secant search process for determining a desired impedance value between an RFID IC and a tag antenna.

In some embodiments, the controller may iterate through different impedance settings based on a secant search algorithm. FIG. 11 is a flowchart depicting a secant search process 1100 for determining a desired impedance value between an RFID IC and a tag antenna. In step 1102, as in step 1002 above, a controller selects the minimum available impedance value as an initial $Z_{LOW}$ and the maximum available impedance value as $Z_{HIGH}$. The controller also selects an initial mid value, $Z_{MID}$, midway between $Z_{LOW}$ and $Z_{HIGH}$ (i.e., $Z_{LOW}=(Z_{LOW}+Z_{HIGH})/2$). In step 1104, the controller determines the peak voltage (power) values available at each of $Z_{HIGH}$, $Z_{MID}$, and $Z_{LOW}$. The controller then compares the peaks at $Z_{LOW}$ and $Z_{HIGH}$. If the peak at $Z_{LOW}$ is lower compared to the peak at $Z_{HIGH}$, then in step 1106 the controller generates a new value for $Z_{LOW}$ by interpolating between $Z_{LOW}$ and $Z_{MID}$ using $Z_{LOW}$, $Z_{MID}$, and the peaks at $Z_{LOW}$, $Z_{MID}$, $Z_{HIGH}$. For example, the controller may generate a linear relationship that satisfies both ($Z_{LOW}$, peak at $Z_{LOW}$) and ($Z_{HIGH}$, peak at $Z_{HIGH}$). The controller then uses the linear relationship to determine a new $Z_{LOW}$ with a peak corresponding to the peak voltage (power) seen at $Z_{HIGH}$. In step 1108, the controller then updates $Z_{MID}$ to midway between $Z_{HIGH}$ and the new $Z_{LOW}$.

On the other hand, if in step 1104 the peak at $Z_{LOW}$ is higher compared to the peak at $Z_{HIGH}$, then in step 1110 the controller generates a new value for $Z_{HIGH}$ by interpolating between $Z_{MID}$ and $Z_{HIGH}$ using $Z_{MID}$, $Z_{HIGH}$, and the peaks at $Z_{LOW}$, $Z_{MID}$, $Z_{HIGH}$, as described above in step 1106. In step 1112, the controller then updates $Z_{MID}$ to midway between the new $Z_{HIGH}$ and $Z_{LOW}$. Regardless of the impedance value that is updated, the controller then returns to step 1104.

Finally, if in step 1104 the $Z_{LOW}$ peak is substantially similar to the $Z_{HIGH}$ peak, or if the impedance index is less than 2 (i.e., there are less than two remaining available impedance values), the controller sets the desired impedance, $Z_{MID}=(Z_{HIGH}+Z_{LOW})/2$ in step 1114.

As with process 1000, in some embodiments instead of setting $Z_{MID}$ or updating impedance values to the average of the previous impedance values (i.e., $Z_{MID}$/updated impedance=$(Z_{HIGH}-Z_{LOW})$*alpha, where alpha=0.5), the process may use a different value for alpha. For example, the value of alpha may range between 0 and 1.

Figure 12:
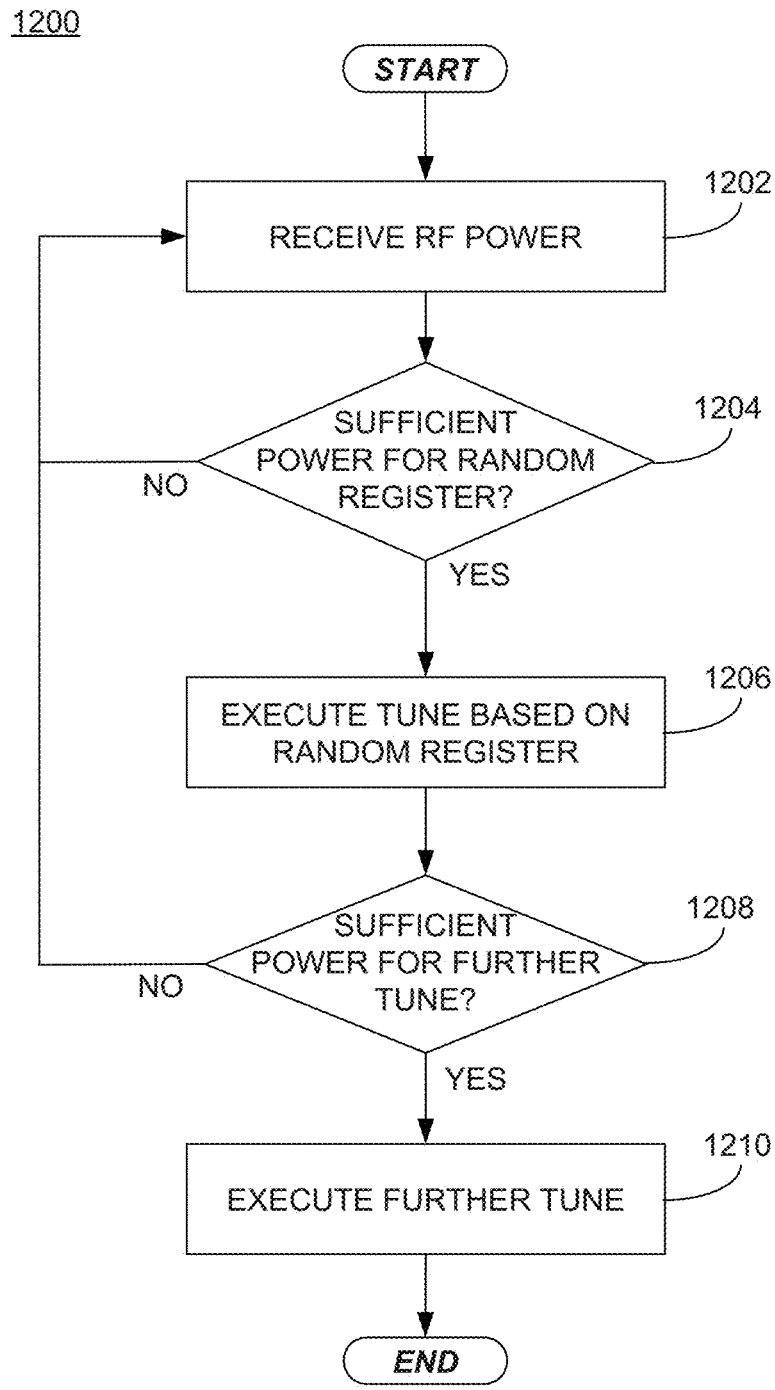
FIG. 12 is a flowchart depicting a multi-stage impedance matching process using a random register.

As described above, an RFID tag impedance matching system may be configured to operate at a lower input power/voltage than other components of the RFID tag to allow for tag impedance adjustment even if initially mismatched. In some embodiments, some portions of the impedance matching system may be configured to operate with even lower input power/voltage than other components in the impedance matching system. For example, a register that powers up in a random state may be used to provide an initial matching impedance. FIG. 12 is a flowchart depicting a multi-stage impedance matching process 1200 using a random register.

In step 1202, a tag rectifier may convert a received RF wave into an input voltage or power. In step 1204, it may be determined if the input power is sufficient to power-up a random register (i.e., a register that powers-up in a random state). If not, the process moves back to step 1202. On the other hand, if the input power is sufficient to power-up the random register, in step 1206 a tune or impedance-matching operation may be performed based on the powered random register. For example, a tag impedance-matching system may include a number of impedance elements, each connected to the tag front-end (e.g., to the antenna contacts 432/433) via a switch. Each of the switches may in turn be coupled to a bit of the random register. When the random register powers up, it does so in a random state, with each of its bits having a random value. Therefore, each time the random register powers up, it in effect selects a random total impedance. In step 1208, it is determined if the random total impedance selected by the random register in step 1206 provides sufficient power for additional impedance-matching operations (e.g., those described in FIGS. 8-11). If so, those impedance-matching operations are performed. On the other hand, if not enough power is received, the process moves back to step 1202.

In some embodiments, after at least one random tune cycle has been completed, a counter may be used to step through possible tuning states (i.e., matching impedance values) if the input power is sufficient to maintain the counter. The counter may step sequentially between adjacent states, or may skip one or more states to increase the probability that the next state will provide a better impedance match. In some embodiments, the initial matching impedance may be provided by a default initial impedance setting value. If the default impedance setting value does not provide sufficient power for tuning, then the random register may be used to select subsequent impedance setting values.

Figure 13:
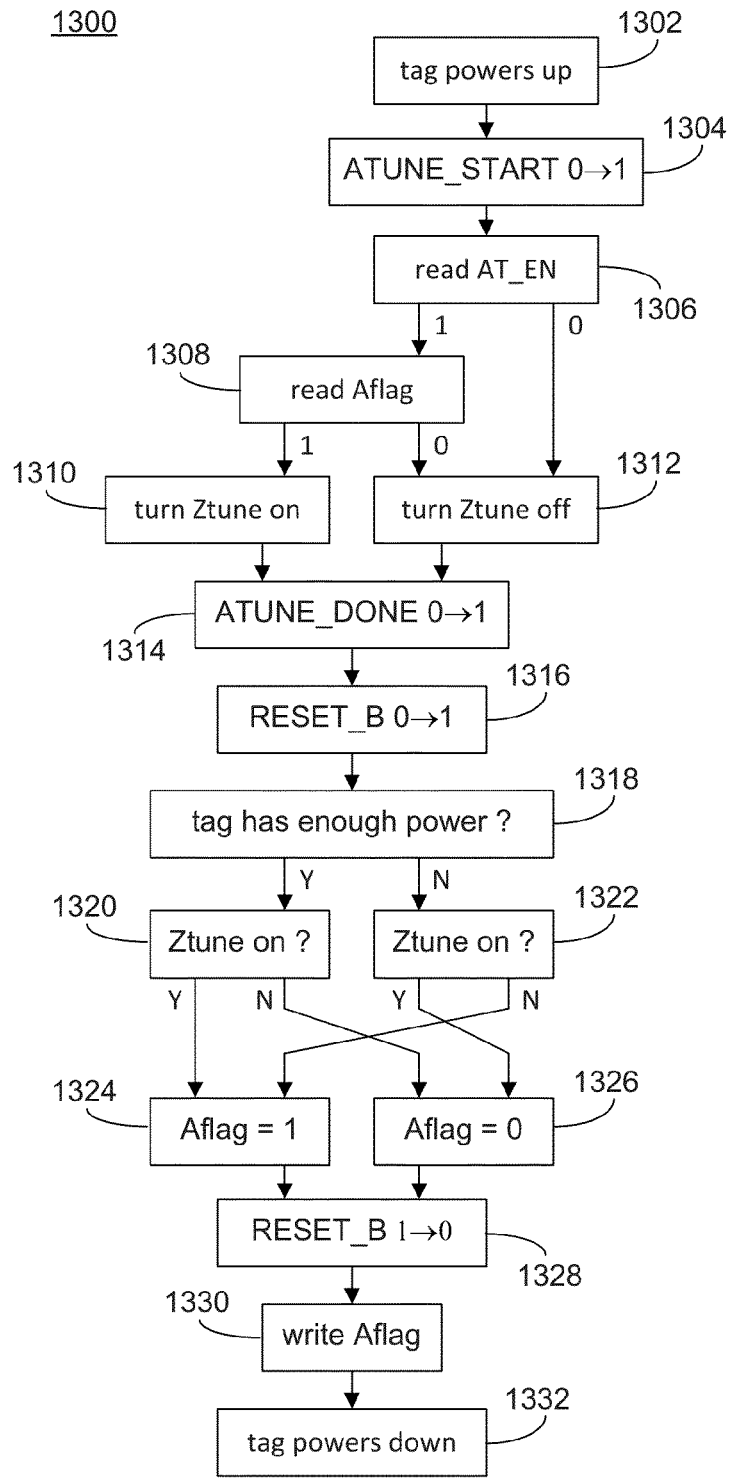
FIG. 13 is a flowchart depicting a process for switching impedance values between an RFID IC and a tag antenna.

FIG. 13 is a flowchart depicting a process 1300 for switching impedance values between an RFID IC and a tag antenna. In step 1302, an RFID tag IC may begin to power up. In step 1304, a tag power management unit (e.g., rectifier/PMU 441) may instruct a tuning circuit to begin the self-tuning process.

In step 1306, the tuning circuit may first check to see if the self-tuning capability ("AT_EN") is enabled (has a value of "1"). If so, the tuning circuit may determine an initial tuning parameter (the "Aflag") in step 1308. If the Aflag is enabled (has a value of "1"), the tuning circuit may enable a matching impedance ("Ztune") in step 1310. On the other hand, if the Aflag is disabled (has a value of "0") or if the self-tuning capability is not enabled ("AT_EN" is "0"), then the tuning circuit may disable the matching impedance in step 1312. Regardless, the tuning circuit may then inform the tag power management unit that the self-tuning process is complete in step 1314, and the tag IC may begin normal, full-power operation in step 1316.

Subsequently, in step 1318 the tag IC may determine if it has sufficient power for operation. If so, the tag IC may maintain the original value of Aflag, the initial tuning parameter. To do so, the tag IC may check to see if the matching impedance is enabled in step 1320. If so, the tag IC keeps the Aflag value at its original value of "1" in step 1324. If not, the tag IC also keeps the Aflag value at its original value, which was "0", in step 1326. Subsequently, if the tag IC powers down in step 1328 because it is idle or because it was commanded to do so (i.e., not because it doesn't have sufficient power for operation), it may write the Aflag in step 1330 and power down in step 1332.

On the other hand, if in step 1318 the tag IC determined that it does not have sufficient power for operation, it may switch the original value of Aflag, the initial tuning parameter. To do so, the tag IC may check to see if the matching impedance is enabled in step 1322. If so, the tag IC switches the value of Aflag to "0" in step 1326, and if not, the tag IC switches the value of Aflag to "1" in step 1324. Subsequently, when the tag IC powers down in step 1328 because it doesn't have sufficient power for operation, it may write the new Aflag value in step 1330 and power down in step 1332.

As described above, a tuning element (e.g., tuning element 622) can be adjusted dynamically in order to compensate for an impedance mismatch between a tag antenna and a tag IC. In embodiments where a tuning element is controlled using a digital interface, the tuning element may be configured to have its impedance be adjusted in discrete tuning steps. These discrete tuning steps may be uniform (i.e., the change in impedance or impedance step size between each adjacent step is the same) or nonuniform (i.e., the change in impedance or impedance step size between each adjacent step is not the same). In some embodiments, nonuniform tuning steps are desirable because they can provide relatively high tuning resolution at certain portions of the tuning range while keeping the number of total tuning steps in the tuning range relatively low.

Figure 14:
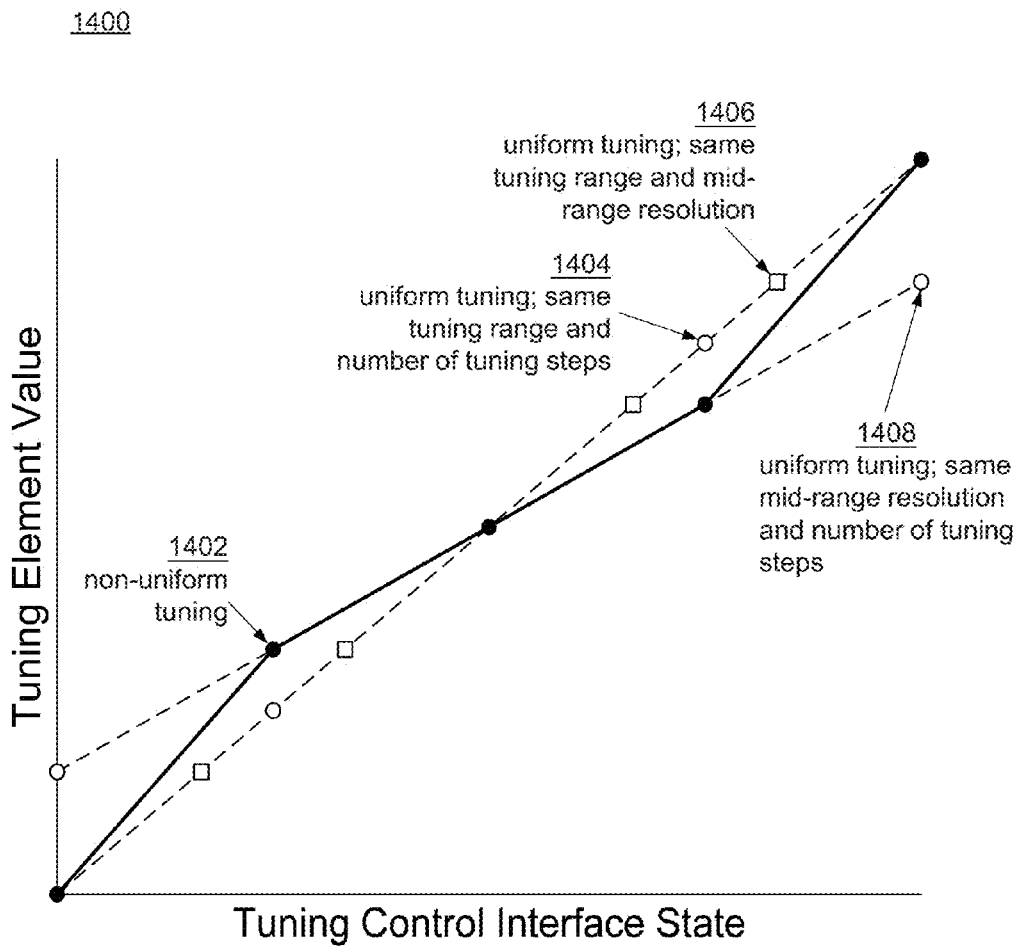
FIG. 14 is a chart depicting adjusting tuning element impedance using non-uniform steps and uniform steps.

FIG. 14 is a chart 1400 depicting adjusting tuning element impedance using non-uniform steps and uniform steps. Chart 1400 depicts a number of tuning characteristics 1402-1408. Characteristic 1402 is a non-uniform tuning characteristic with five discrete steps (represented by the filled circles). Characteristic 1402 is configured to provide higher tuning resolution at the middle of the tuning range, where resolution is more important (i.e., between the second and fourth steps), than at the edges of the tuning range (i.e., between the first and second steps and between the fourth and fifth steps). This difference in tuning resolution is represented by the difference in slope between the two regions, with higher resolution corresponding to lower slope.

Uniform tuning characteristics are not able to provide all the benefits of non-uniform tuning characteristic 1402. Characteristic 1404 is a uniform tuning characteristic that attempts to replicate the tuning range and number of tuning steps of characteristic 1402. However, as a result, characteristic 1404 has a lower tuning resolution at the middle of the tuning range compared to characteristic 1402, as shown by its higher slope.

Characteristic 1406 is another uniform tuning characteristic that instead attempts to replicate the tuning range and mid-range resolution of characteristic 1402. However, characteristic 1406 has seven discrete tuning steps, whereas characteristic 1402 only has five discrete tuning steps. As a result, more time may be required to cycle through characteristic 1406 than characteristic 1402. Because the total available tuning time for an RFID tag may be limited by the protocol used (e.g., the Gen2 Specification), tuning characteristics that take less time to cycle through (i.e., that have fewer tuning steps) may be preferable.

Finally, characteristic 1408 is yet another uniform tuning characteristic that attempts to replicate the mid-range resolution and number of tuning steps of characteristic 1402. However, the result is that characteristic 1408 has a smaller tuning range (i.e., covers a smaller range of tuning element values) than characteristic 1402.

FIG. 15 is a table 1500 depicting tuning states for a 3-bit tuning control interface according to embodiments. In this embodiment, the tuning control interface (e.g., tuning control interface 624) has three bits, labeled in the top row. Bit 0 has a tuning element impedance weight of "b", bit 1 has a tuning element impedance weight of "a+b", and bit 2 has a tuning element impedance weight of "a", where "a" and "b" are different values. A tuning circuit (e.g., tuning circuit 620) may have different tuning states, each corresponding to a distinct tuning element impedance value. The tuning circuit can then adjust the impedance value of a tuning element (e.g, tuning element 622) by using tuning control interface signals with different values. For example, a tuning circuit state of "0" corresponds to a tuning element impedance value of "0", represented by a tuning control interface signal of "000" (where the leftmost bit represents bit 2 and the rightmost bit represents bit 0). A tuning circuit state of "1" corresponds to a tuning element impedance of "b", represented by a tuning control interface signal of "001". A tuning circuit state of "2" corresponds to a tuning element impedance of "a+b", represented by a tuning control interface signal of "010". A tuning circuit state of "3" corresponds to a tuning element impedance of "2a+b", represented by a tuning control interface signal of "110". Finally, a tuning circuit state of "4" corresponds to a tuning element impedance of "2a+2b", represented by a tuning control interface signal of "111".

As described above, tuning control interface signal values do not have to correspond to tuning circuit state values. The particular tuning control interface signal value (and therefore the corresponding tuning element impedance value) for each tuning circuit state may be selected based on the desired distribution of tuning element impedance values over the desired tuning range. For example, the tuning control interface signal and tuning element impedance values in table 1500 are selected to provide an impedance spacing (or delta) of "b" between states 0 and 1 and between states 3 and 4, and an impedance delta of "a" between states 1 and 2 and states 2 and 3. Similarly, while the tuning circuit has five states in this embodiment, in other embodiments a tuning circuit may have more or fewer states.

The steps described in processes 800, 900, 1000, 1100, 1200, and 1300 are for illustration purposes only. Self-tuning of RFID tags may employ additional or fewer steps and in different orders using the principles described herein. Of course the order of the steps may be modified, some steps eliminated, or other steps added according to other embodiments.

In some embodiments, at least part of the impedance-matching process may be manually controlled. For example, the impedance-matching process may be disabled entirely, or the matching impedance may be manually set. The particular algorithm(s) used (e.g., those described in FIGS. 8-12) may be manually selected and/or selected by the tag, and the algorithm starting points may be fixed, manually set, or set as part of the impedance-matching process performed by the tag. In embodiments where the tag selects the algorithms used, the tag may execute multiple algorithms and select from among the best results of the executed algorithms.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

Embodiments as described herein additionally include programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Executing a program's steps or instructions may further require storage media that have stored thereon a program's instructions and/or data, typically in a machine-readable form. This storage media is typically termed a memory, read by a processor or other machine element. In electronic devices the memory may be implemented as Read Only Memory (ROM), Random Access Memory (RAM), and many others as will be well known to those skilled in the art. In some embodiments the memory may be volatile and in others nonvolatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data-processing arts to effectively convey the substance of their work to others skilled in the art. A person skilled in the art of programming may use these descriptions to readily generate specific instructions for implementing a program according to the present invention.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

We claim:

1. A Radio Frequency Identification (RFID) integrated circuit (IC) comprising:
    an antenna port;
    a tuning block coupled to the antenna port, the tuning block having a plurality of discrete elements, wherein a first one of the discrete elements has a first weight and a second one of the discrete elements has a second weight different from the first weight; and
    a tuning circuit configured to:
        detect a first transferred power when operating the tuning block with the first element but not the second element coupled to the antenna port;
        detect a second transferred power when operating the tuning block with at least the second element coupled to the antenna port;
        compare the first and second transferred powers; and
        based on the comparison, couple at least one of the first and second elements to the antenna port for subsequent IC operations.

2. The IC of claim 1, wherein the plurality of discrete elements are capacitors.

3. The IC of claim 1, wherein the tuning circuit is further configured to:
    sequentially increment or decrement through a plurality of impedance settings by coupling the plurality of discrete elements to the antenna port;
    determine a maximum transferred power; and
    store an impedance setting associated with the maximum transferred power.

4. The IC of claim 3, wherein the tuning circuit is further configured to:
    roll over to a minimum impedance setting or a maximum impedance setting subsequent to incrementing to the maximum impedance setting or decrementing to the minimum impedance setting, respectively;
    continue sequentially incrementing or decrementing upon rolling over to the minimum impedance setting or the maximum impedance setting, respectively; and stop incrementing or decrementing when the impedance setting is equal to the stored impedance setting.

5. The IC of claim 3, wherein the tuning circuit is further configured to:
start the sequence based on a default impedance setting or a value in a randomizing register upon powering up; and
roll over to a minimum impedance setting or a maximum impedance setting subsequent to incrementing to the maximum impedance setting or decrementing to the minimum impedance setting, respectively.

6. The IC of claim 5, wherein the tuning circuit is configured to detect the second transferred power when operating the tuning block with the first element and the second element coupled to the antenna port.

7. The IC of claim 1, wherein the tuning circuit is configured to detect the first transferred power by measuring a voltage.

8. A Radio Frequency Identification (RFID) integrated circuit (IC) comprising:
an antenna port;
a tuning block coupled to the antenna port, the tuning block having a first discrete element having a first weight and a second discrete element having a second weight different from the first weight; and
a tuning circuit configured to:
couple the first element but not the second element to the antenna port;
subsequently couple at least the second element to the antenna port; and
then couple at least one of the first and second elements to the antenna port to maximize transferred power for subsequent IC operations.

9. The IC of claim 8, wherein the first and second discrete elements are capacitors.

10. The IC of claim 8, wherein the tuning circuit is further configured to:
sequentially increment or decrement through a plurality of impedance settings by coupling at least one of the first and second elements to the antenna port;
determine a maximum transferred power; and
store an impedance setting associated with the maximum transferred power.

11. The IC of claim 10, wherein the tuning circuit is further configured to:
roll over to a minimum impedance setting or a maximum impedance setting subsequent to incrementing to the maximum impedance setting or decrementing to the minimum impedance setting, respectively;
continue sequentially incrementing or decrementing upon rolling over to the minimum impedance setting or the maximum impedance setting, respectively; and
stop incrementing or decrementing when the impedance setting is equal to the stored impedance setting.

12. The IC of claim 10, wherein the tuning circuit is further configured to:
start the sequence based on a default impedance setting or a value in a randomizing register; and
roll over to a minimum impedance setting or a maximum impedance setting subsequent to incrementing to the maximum impedance setting or decrementing to the minimum impedance setting, respectively.

13. The IC of claim 8, wherein the tuning circuit is configured to subsequently couple the first and second elements to the antenna port before maximizing transferred power for subsequent IC operations.

14. A method to adjust power transfer in a Radio Frequency Identification (RFID) integrated circuit (IC), the method comprising:
detecting a first transferred power when coupling a first element but not a second element to an antenna port of the IC, wherein the first element has a first weight and the second element has a second weight different from the first;
detecting a second transferred power when coupling at least the second element to the antenna port;
comparing the first and second transferred powers; and
based on the comparison, coupling at least one of the first and second elements to the antenna port for subsequent IC operation.

15. The method of claim 14, wherein the first element and the second element are capacitors.

16. The method of claim 14, further comprising:
sequentially incrementing or decrementing through a plurality of impedance settings by coupling at least one of the first element and the second element to the antenna port;
determining a maximum transferred power from the antenna; and
storing an impedance setting associated with the maximum transferred power.

17. The method of claim 16, further comprising:
rolling over to a minimum impedance setting or a maximum impedance setting subsequent to incrementing to the maximum impedance setting or decrementing to the minimum impedance setting, respectively;
continuing sequentially incrementing or decrementing upon rolling over to the minimum impedance setting or the maximum impedance setting, respectively; and
stopping incrementing or decrementing when the impedance setting is equal to the stored impedance setting.

18. The method of claim 16, further comprising:
starting the sequence based on a default impedance setting or a value in a randomizing register; and
rolling over to a minimum impedance setting or a maximum impedance setting subsequent to incrementing to the maximum impedance setting or decrementing to the minimum impedance setting.

19. The method of claim 14, further comprising:
detecting the second transferred power when coupling the first element and the second element to the antenna port.

20. The method of claim 14, further comprising detecting the first transferred power by measuring a voltage.

* * * * *